United States Patent [19]

Dexter et al.

[11] Patent Number: 4,496,676
[45] Date of Patent: Jan. 29, 1985

[54] ULTRAVIOLET-ABSORBING STABILIZERS SUBSTITUTED BY AN ALIPHATIC HYDROXYL GROUP

[75] Inventors: Martin Dexter, Briarcliff Manor; Roland A. E. Winter, Armonk, both of N.Y.

[73] Assignee: Ciba-Geigy Corporation, Ardsley, N.Y.

[21] Appl. No.: 431,499

[22] Filed: Sep. 30, 1982

Related U.S. Application Data

[62] Division of Ser. No. 318,648, Nov. 5, 1981, Pat. No. 4,414,393.

[51] Int. Cl.$^3$ .............................................. C08L 77/10
[52] U.S. Cl. ...................................... 524/99; 548/308; 548/310; 544/221; 524/105; 524/106; 524/210; 564/152
[58] Field of Search ................ 564/152; 548/308, 310; 544/221; 524/99, 105, 106, 210

[56] References Cited

U.S. PATENT DOCUMENTS

| | | | |
|---|---|---|---|
| 3,253,921 | 5/1966 | Sawdey | 432/507 |
| 3,542,573 | 11/1970 | Biland et al. | 106/186 |
| 3,666,713 | 5/1972 | Wear | 524/114 |
| 3,803,091 | 4/1974 | Murfin | 564/152 |
| 4,278,590 | 7/1981 | Dexter et al. | 524/91 |

OTHER PUBLICATIONS

Ciba, "Diarylamides . . . , " Chem. Abst. 70:19823n (1969).
Hafer et al., "Sulfur–Containing Diaryloxalamides . . . , " Chem. Abst. 72:22323w.

*Primary Examiner*—Donald G. Daus
*Assistant Examiner*—G. Hendricks
*Attorney, Agent, or Firm*—Luther A. R. Hall

[57] ABSTRACT

Ultraviolet-absorbing stabilizers of the formula E-(G-R)$_n$, L-(G-E)$_m$, or [G-E$_1$-G-Q]$_p$ where E is a radical derived from an oxanilide, benzalmalonate, α-cyanocinnamate or o-hydroxyphenylbenzotriazole, E$_1$ is a radical derived from an oxanilide, G is —OCH$_2$CHOH—, R is alkyl, phenyl or —CH$_2$OT where T is alkyl or alkenyl, n is 1 or 2, m is 2 or 3, L is a direct bond, alkylene or other bis or tris radical, Q has the same meaning as L when m is 2, and p is 1 to 4, are particularly resistant to loss during weathering of outdoor thermoset or thermoplastic coating systems while exhibiting good stabilization efficacy and compatibility in said systems.

8 Claims, No Drawings

ULTRAVIOLET-ABSORBING STABILIZERS SUBSTITUTED BY AN ALIPHATIC HYDROXYL GROUP

This is a divisional of application Ser. No. 318,648, filed on Nov. 5, 1981, now U.S. Pat. No. 4,414,393, issued on Nov. 8, 1983.

FIELD OF THE INVENTION

The present invention relates to certain ultraviolet absorbing compounds and more particularly to such compounds which are aliphatic glycidyl ether adducts with certain chromophores having reactive phenolic group(s).

The compounds are useful in protecting light-sensitive organic materials, more particularly polymer matrices from actinic deterioration.

BACKGROUND OF THE INVENTION

The UV-absorbers have long been known as effective light stabilizers for organic materials and have enjoyed considerable commercial success. Among the commercial classes of chromophores are the oxanilides, the o-hydroxybenzophenones, the benzalmalonates, the cyanocinnamates and the hydroxyphenylbenzotriazoles.

However, the hitherto known compounds have in some circumstances exhibited limited compatibility in certain substrates, and excessive tendency to exude, sublime and/or volatilize during processing of stabilized compositions into sheets, films, fibers or other pellicles when processing must be done at elevated temperatures. Likewise such compounds may also suffer undue loss by volatilization or sublimation from fabricated structures, particularly thin films or coatings, especially when subjected to elevated temperatures during use.

Attempts have been made to increase compatibility and to reduce volatilization loss by modifying the structure of the compounds. The preparation of bis-o-hydroxybenzophenones is described in U.S. Pat. No. 3,666,713.

To be successful a compound must exhibit an excellent combination of compatibility with and/or solubility in numerous polymeric substrates along with superior resistance to loss from stabilized compositions during high temperature processing or in end use applications where coatings or films of the stabilized compositions are exposed even to ambient weathering and light exposures. While improvements have been noted over the years, experience has shown that state-of-the-art light stabilizers for coatings to be inadequate for new and more stringent requirements for durability under weathering conditions. New coatings formulations had to be developed to decrease the amount of air pollution by release of a solvent to the atmosphere. These "high solids" coatings formulation have a minimal amount of solvent and demand greater solubility from the light stabilizers.

THE INVENTION

We have found surprisingly that, when certain classes of established ultraviolet absorbing chromophores were combined with substituents for solubilizing the molecule in the polymer matrix and with a reactive, anchoring substituent in the form of an adduct with said chromophores, non-fugitive ultraviolet absorbers meeting present stringent commercial requirements are obtained.

The present invention relates to selected 3-alkoxy-2-hydroxypropoxy derivatives of oxanilides, benzalmalonates, α-cyanocinnamates and o-hydroxyphenylbenzotriazoles which provide superior properties in protecting light sensitive organic materials from deterioration and to stabilized compositions containing said compounds compared to 2-alkoxy-3-ethyl-oxanilide and related oxanilides, the benzalmalonates, α-cyanocinnamates and o-hydroxyphenylbenzotriazole compounds which are well known as light stabilizers for organic materials.

A problem with the state-of-the-art compounds is that they have less desirable permanence as stabilizers for organic materials. To be most effective the stabilizer should be compatible with the substrate and be distributed uniformly therein, preferably as a true solution, and have extremely low volatility.

A considerable number of prior art compounds are lost during the coating process, particularly during the baking operations used to dry and/or cure a coating. Additional amounts of these compounds are also lost during accelerated and outdoor ageing.

Loss of the stabilizer results in decreased light stability. Degradation of the coating is shown in a number of ways. The type of degradation observed depends on the type of coating, length of exposure, etc. Signs of degradation are:

1—loss of surface gloss;
2—crazing of the surface;
3—chalking;
4—cracking; and
5—delamination from a base coating.

The light stabilizers of the present invention are more resistant by volatilization and have demonstrated superior stabilization performance. Their superior properties can be related to molecular structure. Pendant alkyl groups provide high molecular weight and greater compatibility with solvents used for coatings and in the coatings themselves. The instant compounds also have free hydroxyl groups that are capable of binding chemically with the coating components of acrylic and polyester enamels that are crosslinked with hydroxymethyl melamine and/or alkoxymethyl melamine curing agents.

An additional advantage of these stabilizers over hydroxybenzophenone ultraviolet absorbers is that they resist the formation of colored complexes with metallic ions, such as $Fe^{+++}$, $Co^{++}$, $Mn^{++}$.

The ultraviolet absorbing stabilizers of the instant invention have the formula $$E-(G-R)_n \qquad (I)$$

$$L-(G-E)_m \qquad (II)$$

or $$[G-E_1-G-Q]_p \qquad (III)$$

wherein

E is selected from the group consisting of the radicals derived from the oxanilides, benzalmalonates, α-cyanocinnamates and o-hydroxyphenylbenzotriazoles, $E_1$ is a radical derived from an oxanilide, G is $-OCH_2CHOH-$ where E or $E_1$ is attached to the oxygen atom, R is alkyl of 1 to 18 carbon atoms, phenyl, p-tolyl or —CH$_2$OT where T is alkyl of 1 to 20 carbon atoms or alkenyl of 3 to 20 carbon atoms, n is 1 or 2 m is 2 or 3

L, when m is 2, is a direct bond, alkylene of 1 to 6 carbon atoms, phenylene, or a radical selected from the group consisting of

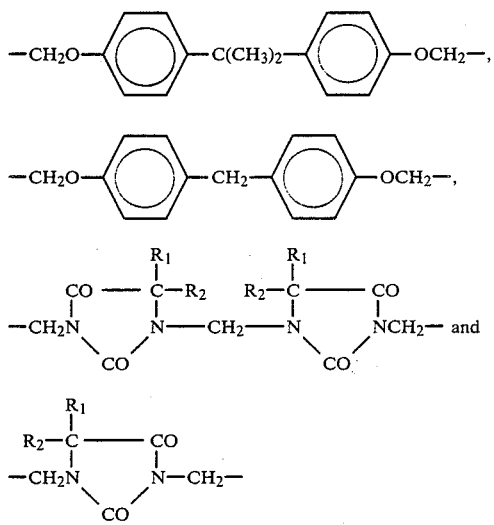

where R$_1$ and R$_2$ are independently alkyl of 1 to 6 carbon atoms or together are tetramethylene or pentamethylene, or L, when m is 3, is

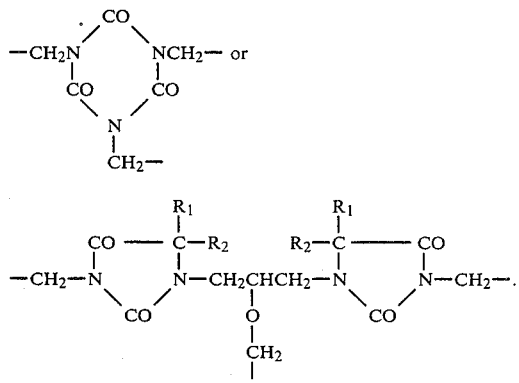

Q has the same meaning as L where m is 2.

p is 1 to 4.

The instant compounds of formula III represent oligomeric materials having as a repeating unit the structure

[G—E$_1$—G—Q]$_p$  (III)

made by the reaction of oxanilide having two hydroxy groups with a bisepoxide.

The instant compounds E—(G—R)$_n$, L(G—E)$_m$ or [G—E$_1$—G—Q]$_p$ consist of three segments each having an important function in the present invention.

Segment E or E$_1$ provides the ultraviolet-absorbing functionality needed for the instant compound to act as a stabilizer against ultraviolet induced deterioration in the stabilized polymer composition.

Segment G provides the secondary aliphatic hydroxyl group which acts as a reactive site for chemically attaching the instant compound to selected polymeric matrices such as in thermoset resins. Even in thermoplastic matrices the presence of the hydroxyl group appears beneficial in the instant stabilizers.

Segment R, L or Q provides the solubilizing or compatibilizing moiety desired to increase the compatibility of the instant compounds in many polymeric matrices. It is noted that with the benzalmalonate or α-cyanocinnamate derived stabilizers the nature of the ester moiety may also be altered to increase solubility. The use of higher alkyl esters in the benzalmalonates or α-cyanocinnamates permits segment R is be lower alkyl and still maintain excellent compatibility.

The radical E or E$_1$ is derived from known ultraviolet-absorbing moieties useful in a variety of commercial ultraviolet absorbers. These include the oxanilides, benzalmalonates, α-cyanocinnamates and o-hydroxyphenylbenzotriazoles. Particularly preferred in the instant invention are the radicals derived from oxanilides, benzalmalonates and α-cyanocinnamates.

Examples of radical E are as follow:

(a) oxanilides

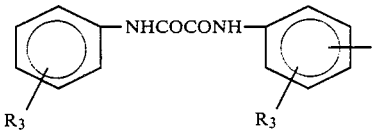

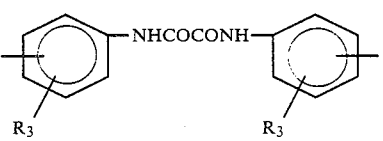

R$_3$ is hydrogen, alkyl of 1 to 12 carbon atoms, alkoxy of 1 to 12 carbon atoms or chloro, (b) benzalmalonates

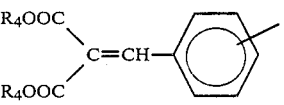

where R$_4$ is alkyl of 1 to 8 carbon atoms, particularly alkyl of 1 to 4 carbon atoms, (c) α-cyanocinnamates

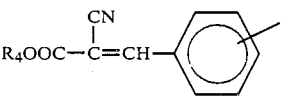

where

R$_4$ is alkyl of 1 to 8 carbon atoms, particularly alkyl of 1 to 4 carbon atoms, and (d) o-hydroxyphenylbenzotriazoles

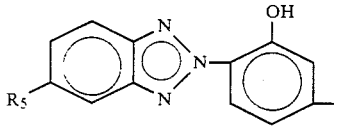

$R_5$ is hydrogen or chloro.

Examples of radical $E_1$ are as follow

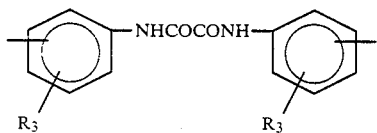

where $R_3$ is as defined above.

The ultraviolet-absorbing moieties from which E or $E_1$ are derived are made by known methods from commercially available intermediates.

The groups G and R, L or Q are also derived from commercially available epoxy compounds. Group G is formed when the epoxy compound is reacted with a phenolic hydroxyl moiety on the ultraviolet absorber. The nature of R, L or Q depends on the specific epoxy compound used.

The preferred epoxy compounds are the glycidyl ethers which lead to the instant compounds where R is —$CH_2OT$ where T is alkyl of 1 to 20 carbon atoms or alkenyl of 3 to 20 carbon atoms. Most preferably T is alkyl of 4 to 14 carbon atoms.

Preferred compounds of the instant invention include compounds having the formula

where T is alkyl of 4 to 14 carbon atoms,

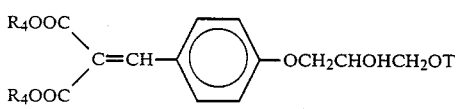

where T is alkyl of 4 to 14 carbon atoms, and $R_4$ is alkyl of 1 to 4 carbon atoms,

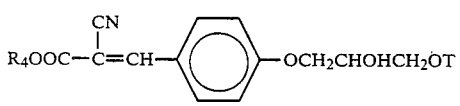

where T is alkyl of 4 to 14 carbon atoms, and $R_4$ is alkyl of 1 to 4 carbon atoms, or

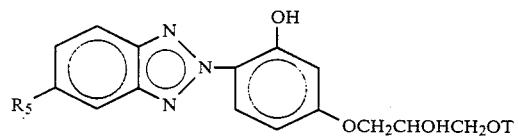

where T is alkyl of 4 to 14 carbon atoms, and $R_5$ is hydrogen or chloro.

Particularly interesting compounds of the instant invention are listed below (a) 4,4′-di(3-n-butoxy-2-hydroxypropoxy)oxanilide;
(b) 3,3′-di(3-n-butoxy-2-hydroxypropoxy)oxanilide;
(c) 2,2′-di(3-n-butoxy-2-hydroxypropoxy)oxanilide;
(d) 2,2′-di(3-n-dodecyloxy-2-hydroxypropoxy)oxanilide;
(e) 2,2′-di(3-n-octyloxy-2-hydroxypropoxy)oxanilide;
(f) 4,4′-di(3-n-dodecyloxy-2-hydroxypropoxy)oxanilide;
(g) 4,4′-di(3-n-octyloxy-2-hydroxypropoxy)oxanilide;
(h) 3,3′-di(3-n-dodecyloxy-2-hydroxypropoxy)oxanilide;
(i) 3,3′-di(3-n-octyloxy-2-hydroxypropoxy)oxanilide;
(j) diethyl 4-(3-n-octyloxy-2-hydroxypropoxy)-benzylidenemalonate;
(k) diethyl 4-(3-n-dodecyloxy-2-hydroxypropoxy)-benzylidenemalonate;
(l) dimethyl 4-(3-n-octyloxy-2-hydroxypropoxy)-benzylidenemalonate;
(m) dimethyl 4-(3-n-dodecyloxy-2-hydroxypropoxy)-benzylidenemalonate;
(n) ethyl 4-(3-n-octyloxy-2-hydroxypropoxy)-α-cyanocinnamate;
(o) ethyl 4-(3-n-dodecyloxy-2-hydroxypropoxy)-α-cyanocinnamate;
(p) 2-[2-hydroxy-4-(3-n-butyloxy-2-hydroxypropoxy)phenyl]-2H-benzotriazole;
(q) 2-[2-hydroxy-4-(3-n-dodecyloxy-2-hydroxypropoxy)phenyl]-2H-benzotriazole, and
(r) 2-[2-hydroxy-4-(3-n-octyloxy-2-hydroxypropoxy)phenyl]-2H-benzotriazole.

The "alkyl" glycidyl ethers are commercially available and are nominally linear alkyl ethers but, as commercially available, contain some unsaturation as the alkyl groups are from some sources derived from fatty-acid reductions and have both mixed nominal carbon contents and small iodine numbers. The terms alkyl and alkenyl where used are to be construed within these commercial constraints. Similarly were long chain alkyl is named as "octyl" or "dodecyl" these are nominal carbon contents as the commercially available glycidyl ethers in this range are listed as "Epoxide 7" "glycidyl ether from $C_8$–$C_{10}$ alcohols"
"Epoxide 8" "glycidyl ether from $C_{12}$–$C_{14}$ alcohol".

The improved permanence, stability, low vapor pressure, and excellent physical properties derive from the improved solubility and compatibility of the UV-bearing chromophore adducts of this invention in the various polymer matrices due to the pendant alkyl side chains. The alkyl groups also improve the solubility of the compounds in the various solvents used.

In addition the secondary alcohol group in the adducts of this invention serves as an anchoring group to form a chemical bond between the stabilizer adduct of this invention and the various crosslinking additives, particularly the hydroxymethyl and alkoxymethyl melamine curing agents that are conventionally used during curing of thermoset acrylic and polyester coating resins.

The hydroxyl group of the light stabilizer serves as a binding site during curing by reacting with the melamine curing agent to become an integral part of the coating.

Formation of the Compounds

The reaction of phenolic hydroxyl groups attached to the UV absorbing chromophore with alkyl glycidyl ethers illustrates a facile method for introducing the hydroxyl group(s) and the solubilizing group in a single step. This method serves for all the preferred chromophore of this invention as well as for most of the other more esoteric chromophores. The reaction proceeds as follows:

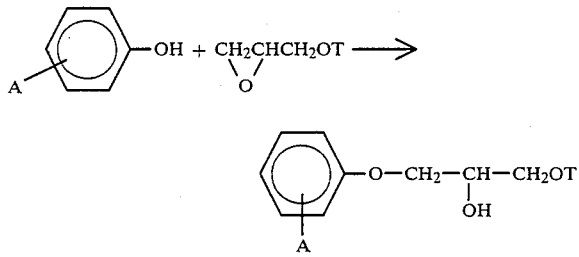

A is remainder of UV absorber molecule.

The intermediates with available phenolic hydroxyl groups related to the established classes of UV absorbers are readily available, specifically for the four above mentioned preferred groups.

Alternate syntheses are available for each of the groups whereby the alkyl glycidyl ether is reacted with nitrophenol followed by the reduction of the nitro group to the amine. This amine is the condensed via conventional procedures with the appropriate intermediate to form the chromphore, such as diethyl oxalate in the case of the oxanilides and similar appropriate intermediates in the case of the other preferred chromophores.

Although the light stabilizers of this invention are most suitable for "melamine" reactive cured coatings based on polyester and polyacrylate backbones and having pendant hydroxy groups these stabilizers are also useful for other polymer materials such as:

1. Polymers which are derived from mono- or diolefins, e.g., polyethylene which can optionally be crosslinked, polypropylene, polyisobutylene, polymethylbutene-1, polymethylpentene-1, polyisoprene, polybutadiene.

2. Mixture of the homopolymers cited under (1), for example mixtures of polypropylene and polyethylene, polypropylene and polybutene-1, polypropylene and polyisobutylene.

3. Copolymers of monomers based on the homopolymers cited under (1), for example ethylene/propylene copolymers, propylene/butene-1 copolymers, propylene/isobutylene copolymers, ethylene/butene-1 copolymers as well as terpolymers of ethylene and propylene with a diene, for example hexadiene, dicyclopentadiene or ethylidene norbornene, and copolymers of α-olefins, e.g., ethylene with acrylic or methacrylic acid.

4. Polystyrene.

5. Copolymers of styrene and of α-methylstyrene, for example styrene/butadiene copolymers, styrene/acrylonitrile copolymers, styrene/acrylonitrile/methacrylate copolymers, styrene/acrylonitrile copolymers modified with acrylic ester polymers to provide impact strength as well as block copolymers, e.g., styrene/butadiene/styrene block copolymers.

6. Graft copolymers of styrene, for example the graft polymer of styrene to polybutadiene, the graft polymer of styrene with acrylonitrile to polybutadiene as well as mixtures thereof with the copolymers cited under (5), commonly referred to as acrylonitrile/butadiene/styrene or ABS plastics.

7. Halogen-containing vinyl polymers, for example polyvinyl chloride, polyvinylidene chloride, polyvinyl fluoride, polychloroprene, chlorinated rubbers, vinyl chloride/vinylidene chloride copolymers, vinyl chloride/vinyl acetate copolymers, vinylidene chloride/vinyl acetate copolymers.

8. Polymers which are derived from $\alpha,\beta$-unsaturated acids and derivatives thereof, polyacrylates and polymethacrylates, polyacrylic amides and polyacrylonitrile. The instant compounds are advantageously used in heat-curable acrylic resin enamels which are composed of a copolymer of acrylic acid and one or more of its derivatives, and a melamine-formaldehyde resin.

9. Polymers which are derived from unsaturated alcohols and amines and from the acyl derivatives thereof or acetals, for example polyvinyl alcohol, polyvinyl acetate, polyvinyl stearate, polyvinyl benzoate, polyvinyl maleate, polyvinyl butyral, polyallyl phthalate, polyallyl melamine and copolymers thereof with other vinyl compounds, for example ethylene/vinyl acetate copolymers.

10. Homopolymers and copolymers which are derived from epoxides, for example polyethylene oxide or the polymers which are derived from bis-glycidyl ethers.

11. Polyacetals, for example polyoxymethylene, as well as polyoxymethylenes which contain ethylene oxide as comonomer.

12. Polyalkylene oxides, for example polyoxyethylene, polypropylene oxide or polybutylene oxide.

13. Polyphenylene oxides.

14. Polyurethanes and polyureas, such as in urethane coatings.

15. Polycarbonates.

16. Polysulfones.

17. Polyamides and copolyamides which are derived from diamines and dicarboxylic acids and/or from aminocarboxylic acids or the corresponding lactams, for example polyamide 6, polyamide 6/6, polyamide 6/10, polyamide 11, polyamide 12, poly-m-phenyleneisophthalamide.

18. Polyesters which are derived from dicarboxylic acids and dialcohols and/or from hydroxycarboxylic acids or the corresponding lactones, for example polyethylene glycol terephthalate, poly-1,4-dimethylolcyclohexane terephthalate.

19. Cross-linked polymers which are derived from aldehydes on the one hand and from phenols, ureas and melamine on the other, for example, phenol/formaldehyde, urea/formaldehyde and melamine/formaldehyde resins.

20. Alkyl resins, for example glycerol/phthalic acid resins and mixtures thereof with melamine/formaldehyde resins.

21. Unsaturated polyesters resins which are derived from copolyesters of saturated and unsaturated dicarboxylic acids with polyhydric alcohols as well as from vinyl compounds as cross-linking agents and also the halogen-containing, flame-resistant modifications thereof.

22. Natural polymers, for example, cellulose, rubber, as well as the chemically modified homologous derivatives thereof, for example cellulose acetates, cellulose propionates and cellulose butyrates and the cellulose ethers, for example methyl cellulose.

While compounds of this invention are very effective stabilizers for a host of organic substrates subject to light induced deterioration, as are light absorbers in general, the instant compounds with their surprising resistance to loss from a stabilized composition during high temperature processing due to volatilization, exudation or sublimation have particular value in stabilizing polymeric substrated which are requested to be processed at elevated temperatures.

Thus, the compounds of this invention are particularly useful as stabilizers for the protection of polyesters, for instance poly(ethylene terephthalate), poly(butylene terephthalate) or copolymers thereof; of polycarbonates, for example polycarbonate derived from bisphenol A and phosgene, or copolymers thereof; of polysulfones; of polyamides such as nylon-6, nylon-6,6, nylon-6,10.and the like as well as copolyamides; of thermoset acrylic resins; of thermoplastic acrylic resins; of polyolefins such as polyethylene, polypropylene, copolyolefins and the like; and of any polymer system requiring high temperature processing and fabrication.

Of particular interest are the thermoplastic acrylic resins and the thermoset acrylic resins used in automotive coatings, finishes and enamels. These materials are described in the encyclopedia of Polymer Science and Technology, Interscience Publishers, New York, Vol 1 (1964), pages 273–276, and Vol 13 (1970), pages 530–532; and W. R. Fuller, "Understanding Paint," American Paint Journal Co. St. Louis, 1965, pages 124,135.

The acrylic resin coatings which according to the invention can be stabilized against light, moisture and oxygen are the customary acrylic resin stoving lacquers, such as are described for example in H. Kittel's 'Lehrbuch der Lacke and Beschichtungen' (Textbook of Lacquers and Coatings), Volume 1, part 2 on pages 735 and 742 (Berlin, 1972) and in H. Wagner, H. F. Sarx, 'Lackkunstharze' (Synthetic resins for Lacquers), on pages 229-235.

Of particular interest is the stabilization, according to the invention, of metallic lacquers based on heat-crosslinkable polyacrylate resins which contain styrene incorporated by polymerization. It would be possible with these resins to produce metallic lacquers having excellent physical and chemical properties if it were not for the formation of cracking on weathering. Other lacquers and enamels are those based on alkyl-melamine and alkyd-acrylic melamine resins.

For obtaining the metallic effect, aluminium pigments are normally employed for this purpose in an amount of 1 to 10 percent by weight, relative to the solvent-free binder (coating resin). The application of the metallic coatings stabilizing according to the invention is effected preferably, in the usual manner, by one of two processes; either by the single-layer process or by the two-layer process. In the latter case, the layer containing the aluminium pigment is firstly applied, and then over this is applied a covering clear-coating layer.

The instant compounds also provide excellent dye light stability to dyed polyamide and polyaramid fibers, such as nylon-6,6, nylon-6, poly(m-phenylene isophthalamide) fibers.

Certain hydrophobic nondiffusing UV absorbers have been disclosed as very useful as ultraviolet light absorbers in photographic gelatin layers (U.S. Pat. No. 3,253,921). The instant adducts with their great resistance to volatilization, their enhanced solubility in selected solvents, their desirable absorption characteristics in the ultraviolet range and their photographic inertness are particularly useful in photographic compositions, especially in protecting color dye images against the harmful effects of ultraviolet light.

Five outstanding properties distinguish the instant compounds over the prior art. These are:

1—Greater solubility in organic solvents commonly used in coating operations;

2—Resistance to loss by volatilization during the drying and curing of paint films;

3—Resistance to loss during prolonged exposure to weathering;

4—Resistance to loss by solvent treatment of the cured coating;

5—Resistance to discoloration with metal ions.

Although the compounds of the invention may be used above to provide a light stabilizing function, the compounds of this invention are often combined with other stabilizers, even other light stabilizers, in the preparation of stabilized compositions. The stabilizers may be used with phenolic antioxidants, pigments, colorants or dyes, light stabilizers such as hindered amines, metal deactivators, etc.

In general, the stabilizers of this invention are employed from about 0.1 to about 5% by weight of the stabilized composition, although this will vary with the particular substrate and application. An advantageous range is from about 0.3 to about 3%.

The stabilizers of Formula I may readily be incorporated into the organic polymers by conventional techniques, at any convenient stage prior to the manufacture of shaped articles therefrom. For example, the stabilizer may be mixed with the polymer in dry powder form, or a suspension of emulsion of the stabilizer may be mixed with a solution, suspension, or emulsion of the polymer. The stabilized polymer compositions of the invention may optionally also contain from about 0.1 to about 5% preferably from about 0.3 to about 3% by weight of various conventional additives particularly phenolic antioxidants or light-stabilizers, or mixtures thereof.

Examples of the phenolic antioxidants, light stabilizers and other conventional additives which may be optionally added to the instant stabilized polymer compositions are given in U.S. Pat. No. 4,278,590. The pertinent portions of said patent on column 8, line 32 to column 10, line 53 are incorporated herein by reference.

The combination of a hindered amine light stabilizer and an instant UV light stabilizers provides a particularly beneficial solution to the combined goal of gloss retention and delamination resistance in metallic thermoset acrylic enamels and in metallic thermoplastic acrylic lacquers for automotive topcoats.

The hindered amine light stabilizers protect the thermoset acrylic enamels and thermoplastic acrylic lacquers against loss of gloss in weathering, but do not act as UV light screens. Accordingly, UV light can pass through the acrylic topcoat in the absence of a UV light absorber and failure of the epoxy ester primer surface beneath the topcoat can then occur.

The addition of instant UV light absorbers into the acrylic topcoat prevents UV light from passing through and causing deterioration of the primer surface beneath.

Thus, a combination of hindered amine with the compounds of this invention in the acrylic topcoat provides both gloss retention and resistance to delamination for the metallic acrylic topcoats.

The hindered amine is effective in this composition in preventing loss of gloss at the 0.1 to 5%, preferably 0.5 to 2%, and most preferably at the 0.5 to 1% by weight level based on the acrylic topcoat resin.

The hindered amine light stabilizers useful in the instant polymer compositions are also recited in detail in U.S. Pat. No. 4,278,590 on column 11, line 16 to column 27, line 9. The most preferred hindered amine light stabilizers are those of formula II given in said patent on column 12, line 14 to column 14, line 3. These portions of said patent are also incorporated herein by reference.

Particularly preferred compositions of the instant invention are those where the hindered amine stabilizer is bis(2,2,6,6-tetramethyl-4-piperidyl) sebacate, bis(1,2,2,6,6,-pentamethyl-4-piperidyl) sebacate or bis(1,2,2,6,6-pentamethyl-4-piperidyl) 2-n-butyl-2-(3,5-di-tert-butyl-4-hydroxybenzyl)malonate.

The following examples are presented for the purpose of illustration only and are not to be construed to limit the nature or scope of the instant invention in any manner whatsoever.

EXAMPLE 1

2,2'-Di(3-n-butoxy-2-hydroxypropoxy)oxanilide

Bis-orthohydroxyoxanilide (25.0 g, 0.0918 moles), 3-n-butoxy-1,2-epoxypropane (40.0 g, 0.296 moles), N-methylpyrrolidone (50 mls) and ethyltriphenylphosphonium bromide (0.6 g, 0.0016 moles) were heated at 130°–140° C. for one hour in a nitrogen atmosphere. Excess 3-n-butoxy-1,2-epoxypropane and N-methylpyrrolidone were then removed by vacuum distillation. The residue was crystallized from methanol to yield 2,2'-di(3-n-butoxy-2-hydroxypropoxy)oxanilide, (35.2 g, 0.066 moles) 75% yield, m.p. 105°–108° C.

EXAMPLES 2–9

Following the general procedure of Example 1, other oxanilide compounds were prepared as seen below.

(TOCH$_2$CHOHCH$_2$O—⟨phenyl⟩—NHCO)$_2$

| Example | T | Ring Substitution | Melting Point °C. | % Yield | Remarks |
|---|---|---|---|---|---|
| 2 | C$_8$–C$_{10}$ | meta | 110–115 | 77 | a, c |
| 3 | C$_4$ | meta | 122–124 | 60 | a, c |
| 4 | C$_4$ | para | 182–186 | 78 | a, c |
| 5 | C$_8$–C$_{10}$ | ortho | 79–84 | 46 | b, d |
| 6 | C$_{12}$–C$_{14}$ | ortho | 63–71 | 24 | b, d |
| 7 | C$_{12}$–C$_{14}$ | meta | 108–115 | 57 | b, d |
| 8 | C$_{12}$–C$_{14}$ | para | 158–164 | 51 | b, d |
| 9 | C$_8$–C$_{10}$ | para | 172–180 | 45 | b, e | a. Solvent was N—methylpyrrolidone
b. Solvent was N,N—dimethylformamide
c. Catalyst was ethyltriphenylphosphonium bromide.
d. Catalyst was benzyldimethylamine.
e. Catalyst was potassium hydroxide.

EXAMPLES 10–13

Substituted Benzalmalonates

Using the general procedure of Example 1, but replacing the oxanilide with a half equivalent amount of a benzalmalonate, the following compounds were prepared.

(R$_4$OOC)$_2$C=CH—⟨phenyl⟩—OCH$_2$CHOHCH$_2$OT

| Example | R$_4$ | T | Remarks |
|---|---|---|---|
| 10 | ethyl | C$_8$–C$_{10}$ | all products |
| 11 | ethyl | C$_{12}$–C$_{14}$ | of Examples |
| 12 | methyl | C$_8$–C$_{10}$ | 10–13 were |
| 13 | methyl | C$_{12}$–C$_{14}$ | pale yellowish oils |

EXAMPLES 14–15

Substituted α-Cyanocinnamates

Using the general procedure of Example 1, but substituting a half equivalent amount of an α-cyanocinnamate for the oxanilide, the following compounds were prepared.

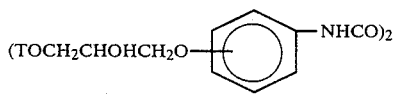

| Example | R$_4$ | T |
|---|---|---|
| 14 | ethyl | C$_8$–C$_{10}$ |
| 15 | ethyl | C$_{12}$–C$_{14}$ |

EXAMPLE 16

Resistance to Loss during Weathering in Thermoset Acrylic Coatings

This test was originally established by a European auto manufacturer to accelerate U.V. delamination evaluations. Essentially, U.V. radiation is the cause of primer chalking which destroys the adhesion of the automotive topcoat resulting in peeling of the topcoat. This problem is particularly severe in topcoats with U.V. transparent coloration such as high metallics (mostly aluminum flake with a low level of organic or inorganic pigment).

This test eliminated all pigment in the topcoat and simply constituted a clear automotive topcoat directly over the epoxy ester primer surfaces. This creates an extremely difficult adhesion problem when the coating is exposed to U.V. irradiation.

The delamination of U.V. transparent automotive topcoats when applied over epoxy ester primer surfaces is a serious problem for automobile manufacturers. This problem is particularly exacerbated when the final coating film thickness is below specification. The incorporation of U.V. absorbers into the topcoats is indicated as a way to protect said topcoats from delamination and to prevent undue loss of gloss.

An acrylic/melamine thermoset enamel was formulated with 1, 3 or 5% by weight of a compound of the instant invention. These formulations were then sprayed as a topcoat over a primer surface consisting of an epoxy ester on a metallic panel. The cure schedule was 30 minutes at 120° C. to give a topcoat film thickness of 1.5 mils (38 microns, 0.0381 mm).

Some panels were then oven aged for 10 days at 100° C. to accelerate any volatile loss of U.V. absorber from the topcoat.

The panels, both oven aged and as cured without oven aging, were then subjected to accelerated weathering in a QUV accelerated weathering tester consisting of a fluorescent sunlamp light source combined with a humidity cabinet to simulate outdoor weathering conditions. The exposure involved alternating a 4-hour period of UV irradiation at 60° C. with a 4-hour period of condensation (rain) at 50° C. till failure occurred. Failure criterion was the first visual appearance of chalking of the primer surface.

The results are given in Table A.

TABLE A

| Compound of Example No. | % by weight | Oven Aged after Curing | Hours to Primer Coat Failure in QUV Tester |
| --- | --- | --- | --- |
| none | — | no | 185 |
| none | — | yes | 185 |
| 1 | 1 | no | 390 |
| 1 | 1 | yes | 280 |
| 1 | 3 | no | 1100 |
| 1 | 3 | yes | 1100 |
| 6 | 1 | no | 185 |
| 6 | 1 | yes | 185 |
| 6 | 3 | no | 850 |
| 6 | 3 | yes | 650 |
| 6 | 5 | no | 1100 |
| 6 | 5 | yes | 1100 |
| 2 | 1 | no | 390 |
| 2 | 1 | yes | 280 |
| 12 | 1 | no | 390 |
| 12 | 1 | yes | 280 |
| 12 | 3 | no | 1340 |
| 12 | 3 | yes | 1200 |
| 12 | 5 | no | 1340 |
| 12 | 5 | yes | 1200 |
| 13 | 1 | no | 390 |
| 13 | 1 | yes | 280 |
| 13 | 3 | no | 1000 |
| 13 | 3 | yes | 1200 |
| 13 | 5 | no | >1340 |
| 13 | 5 | yes | 1340 |
| 14 | 1 | no | 280 |
| 14 | 1 | yes | 185 |
| 14 | 3 | no | 600 |
| 14 | 3 | yes | 390 |
| 14 | 5 | no | 1200 |
| 14 | 5 | yes | 1200 |
| 15 | 1 | no | 390 |
| 15 | 1 | yes | 390 |
| 15 | 3 | no | 850 |
| 15 | 3 | yes | 700 |
| 15 | 5 | no | 1200 |
| 15 | 5 | yes | 1000 |

The instant compounds particularly at the 3% by weight level or above provide excellent protection to the primer surface preventing chalking and subsequent failure of such structures by delamination.

EXAMPLE 17

Gloss and Delamination Values of Topcoats of Thermoplastic Acrylic Lacquer

A silver metallic thermoplastic acrylic lacquer is formulated to include an instant light stabilizer and then was sprayed as a topcoat over a primer surface consisting of an epoxy ester on a metallic panel. Thermoplastic acrylic lacquer is based on a binder of 60% poly(methyl methacrylate), 20% cellulose acetate butyrate and 20% plasticizer with about 3 phr of metallic pigment.

The panels are then exposed for one year in South Florida in an unheated black box at an angle of 5° to the sun.

The panels following the South Florida Black Box Exposure are contained for 96 hours in constant humidity chamber at 38° C. and 100% relative humidity. The panels are then removed from the chamber, wiped dry and immediately evaluated using the crosshatch tape adhesion test. The panels are then allowed to recover for one hour at room temperature before the crosshatch tape adhesion test is run at a different spot on the same panel. Samples generally show some improved delamination resistance following the one hour recovery period from the most severe delamination condition namely immediately after humidification.

The cross-hatch tape adhesion test involves using a multi-cut knife to prepare cross-hatches through the topcoat film on the panel. An acetate fiber adhesive tape is placed over the cross-hatch area and then is pulled off. A visual inspection of the amount of topcoat, if any, coming off with the tape as it is pulled gives a relative rating of the amount of delamination.

The instant compounds protect a thermoplastic acrylic topcoat from delamination after one year of South Florida Black Box Exposure under the most severe testing conditions immediately following humidification.

EXAMPLE 18

Delamination Values of Topcoats of Thermoset Acrylic Enamels

A silver metallic thermoset acrylic enamel is formulated to include an instant light stabilizer and then sprayed as a topcoat over a primer surface consisting of an epoxy ester on a metal panel. Thermoset acrylic enamel is based on a binder of 70% of acrylic monomers such as hydroxyethyl acrylate, styrene, acrylonitrile, butyl acrylate and acrylic acid and with 30% of a melamine resin crosslinking agent. This panel was then exposed in the QUV weathering test described in Example 16.

The panels following the QUV exposure are humidified, then tested for delamination resistance, then allowed to recover for one hour and then retested for delamination resistance as described in Example 17.

The combination of hindered amine light stabilizers and the instant benzotriazole UV light absorbers provides a particularly beneficial solution to the combined goal of gloss retention and delamination resistance in metallic thermoset acrylic enamels and in metallic thermoplasticc acryllic lacquers, for automotive topcoats.

The hindered amine light stabilizers even at low concentrations (0.5% by weight) protect the thermoset acrylic enamels and thermoplastic acrylic lacquers acrylic enamels and thermoplastic acrylic lacquers against loss of gloss, but do not act as UV light screens. Accordingly, UV light can pass through the acrylic topcoat in the absence of a UV light absorber, such as the instant compounds, and cause deterioration and failure in epoxy ester primer surface beneath the topcoat. Incorporation of even low concentrations (0.5% by weight) of a UV absorber in combination with a hindered amine provides both gloss retention and resistance to delamination for the metallic acrylic topcoats.

EXAMPLE 19

Delamination Values of Topcoats of Thermoset Acrylic Enamels

Two silver metallic thermoset acrylic enamels are formulated to include both a hindered amine light stabilizer and a light absorber. Test panels are prepared and tested as described in Example 18.

When the thermoset acrylic enamel described in Example 18 contains a hindered amine light stabilizer such as bis-(2,2-6,6-tetramethyl-4-piperidyl) sebacate or bis-(1,2,2,6,6-pentamethyl-4-piperidyl) 2-n-butyl-2-(3,5-di-tert-butyl-4-hydroxybenzyl)malonate alone delamination rating values are essentially the same as those for the unstabilized enamel. Excellent delamination rating values are obtained when a combination of the hindered amine light stabilizer and the instant benzotriazole UV absorbers are used to stabilize the enamel.

EXAMPLE 20

Delamination and 20° Gloss Values of Thermoplastic Acrylic Lacquers

The efficacy of combinations of hindered amine light stabilizers and the instant light absorbes in providing highly beneficial protection to automotive topcoats is well demonstrated with thermoplastic acrylic resins wherein both gloss retention after prolonged exposure in South Florida is provided by the hindered amine component while the instant light absorber protects the thermoplastic acrylic topcoat from delamination.

A silver metallic thermoplastic acrylic lacquer is formulated to include both a hindered amine light stabilizer and a light absorber. Test panels are prepared and tested as described in Example 17.

The lacquer containing both a hindered amine light stabilizer (such as those named in Example 19) and a UV absorber exhibits excellent 20° Gloss Values and Delamination Values.

EXAMPLE 21

2-[2-Hydroxy-4-(3-n-octyloxy-2-hydroxypropoxy)-phenyl]-2H-benzotriazole

A mixture of 2-(2,4-dihydroxyphenyl)-2H-benzotriazole (7.0 grams, 0.031 mole), 3-n-octyloxy-1,2-epoxypropane (10.7 grams, 0.046 moles), N-methyl-2-pyrrolidone (40 ml) and ethyltriphenylphosphonium bromide (0.2 gram) was heated for four hours at 135°–150° C. The solvent and excess epoxide were then removed by distillation. The resulting residue was dissolved in methylene chloride, washed with hydrochloric acid, water and sodium chloride solution before passing through a silica gel column. The product was obtained as a yellow oil which crystallized on standing. Recrystallization from heptane gave the above named product with a melting point of 51°–55° C.

The corresponding n-butyloxy and n-dodecyloxy compounds are also made by the procedure of this example.

EXAMPLE 22

When, in the general procedure of Example 1, the bis-orthohydroxyoxanilide is reacted with an essentially equimolar amount of the bisepoxide, 2,2-(4,4'-diglycidyloxyphenyl)propane, an oligomer having the structural repeating unit

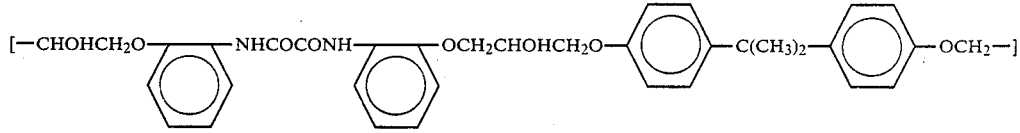

is prepared.

What is claimed is:

1. An ultraviolet-absorbing, matrix-reactive compound having the formula $$E-(G-R)_n \quad \text{(I)}$$

$$L-(G-E)_m \quad \text{(II)}$$

or $$[G-E_1-G-Q]_p \quad \text{(III)}$$

wherein

E or $E_1$ is a radical derived from an oxanilide,

G is —OCH$_2$—CHOH— where E or $E_1$ is attached to the oxygen atom,

R is alkyl of 1 to 18 carbon atoms, phenyl, p-tolyl or —CH$_2$OT where

T is alkyl of 1 to 20 carbon atoms or alkenyl of 3 to 20 carbon atoms, n is 1 or 2 m is 2 or 3,

L, when m is 2, is a direct bond, alkylene of 1 to 6 carbon atoms, phenylene, or a radical selected from the group consisting of

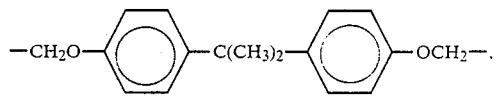

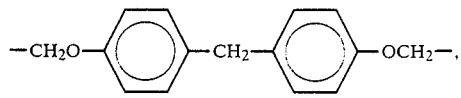

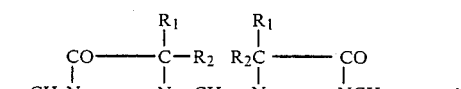

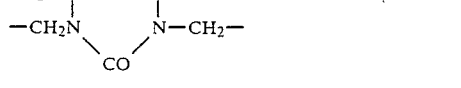

where $R_1$ and $R_2$ are independently alkyl of 1 to 6 carbon atoms or together are tetramethylene or pentamethylene, or L, when m is 3, is

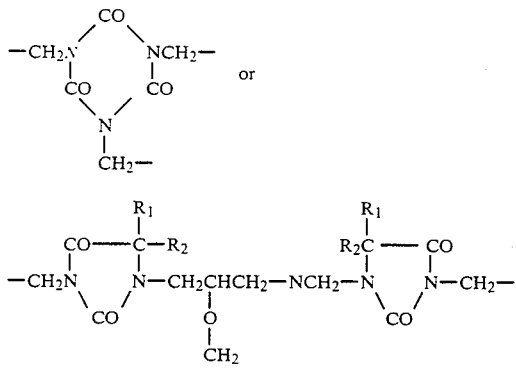

Q has the same meaning as L where m is 2, and p is 1 to 4.

2. A compound according to claim 1 wherein R is —CH₂OT where T is alkyl of 1 to 20 carbon atoms or alkenyl of 3 to 20 carbon atoms.

3. A compound according to claim 2 wherein T is alkyl of 4 to 14 carbon atoms.

4. A compound according to claim 1 having the formula

where T is alkyl of 4 to 14 carbon atoms.

5. A compound according to claim 1 selected from the group consisting of
  (a) 4,4'-di(3-n-butoxy-2-hydroxypropoxy)oxanilide;
  (b) 3,3'-di(3-n-butoxy-2-hydroxypropoxy)oxanilide;
  (c) 2,2'-di(3-n-butoxy-2-hydroxypropoxy)oxanilide;
  (d) 2,2'-di(3-n-dodecyloxy-2-hydroxypropoxy)oxanilide,
  (e) 2,2'-di(3-n-octyloxy-2-hydroxypropoxy)oxanilide;
  (f) 4,4'-di(3-n-dodecyloxy-2-hydroxypropoxy)oxanilide;
  (g) 4,4'-di(3-n-octyloxy-2-hydroxypropoxy)oxanilide; and
  (h) 3,3'-di(3-n-dodecyloxy-2-hydroxypropoxy)oxanilide.

6. A stabilized composition which comprises
  (a) a polymer, and
  (b) 0.1 to 5% by weight of said polymer of a compound according to claim 1.

7. A stabilized composition according to claim 6 which additionally contains 0.1 to 5% by weight, based on the polymer being stabilized, of a hindered amine light stabilizer.

8. A composition according to claim 7 where the hindered amine light stabilizer is bis(2,2,6,6-tetramethyl-4-piperidyl) sebacate, bis(1,2,2,6,6-pentamethyl-4-piperidyl) sebacate or bis(1,2,2,6,6-pentamethyl-4-piperidyl) 2-n-butyl-2-(3,5-di-tert-butyl-4-hydroxybenzyl)malonate.

* * * * *